3,364,814
METHOD OF OPTICAL PRINTING ESPECIALLY FOR DISANAMORPHOSATION AND ANAMORPHOSATION OF FILMS
Popescu Iuliu, Str. Garii de Nord 2, Bucharest, Rumania
Filed Oct. 15, 1964, Ser. No. 404,191
Claims priority, application Rumania, Oct. 15, 1963, 46,997
4 Claims. (Cl. 88—24)

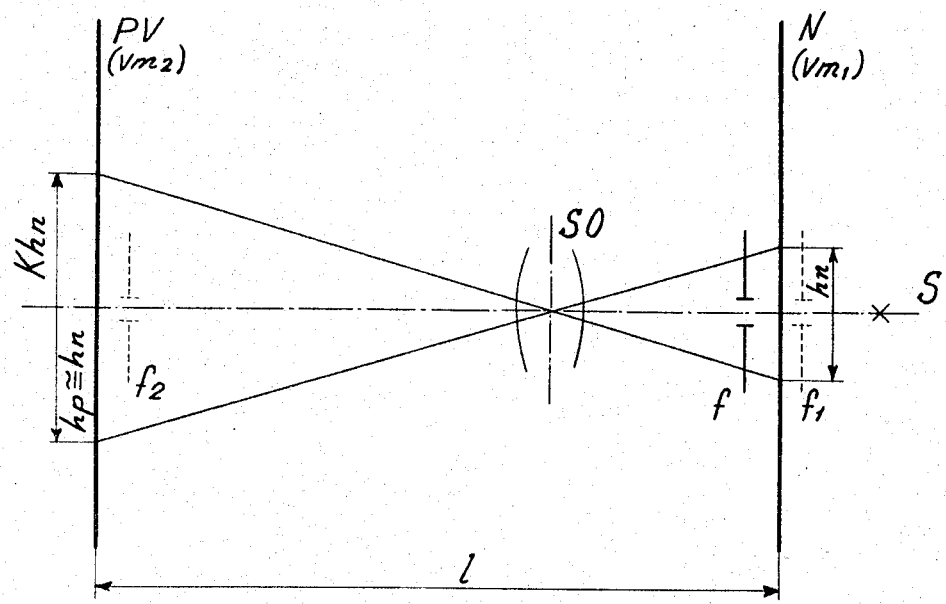

The present invention deals with an optical printing method especially adapted for the disanamorphosation and anamorphosation of films. The new method of this invention has made possible the printing of anamorphotic films, while subjecting the films simultaneously to disanamorphosation; the novel method is independent of the anamorphose factor used during the filming operations; the method of this invention can also be used in the printing of films by means of anamorphosation, regardless of whether said films had been previously anamorphosated or not; the method of this invention is entirely independent from the so-called "anamorphotic factor" in the printing operation; thus, a single printer may be used instead of several ones.

Several known methods of disanamorphosation have so far been used in the film printing art. A well known method of printing by means of disanamorphosation or anamorphosation, uses an anamorphotic system of lenses (cylindrical, prismatic, etc.); another known method is that of printing by means of disanamorphosation, which includes the steps of screening the negatives in oblique projection and then of filming the images without using the above mentioned techniques (cylindrical, prismatic, lenses, etc.)

All of the heretofore known embodiments of anamorphotic optical systems have the following shortcomings; no compensation for the variations of the anamorphose factor of the anamorphotic optics used in the filming operations is provided for; due to the characteristics of disanamorphosation optics, additional deflections to the positive print are introduced, and this causes a deterioration of the image; due to the intricate optical techniques involved in the known devices, they cannot but transmit a limited (small) amount of information, the result being a reduction of the resolving power of the device, as well as of the limits of shades transmission.

The known method of projecting the negative in oblique projection has succeeded in overcoming some of the shortcomings of the aforementioned method; it leads nevertheless to a relatively great loss of light; this is due to the fact that the projection takes place on a diffuse and oblique screen, which renders a great deal more difficult the disanamorphosation operations of color films having a normal sensitivity; on the other hand, this method causes losses insofar as the amount of information to be transmitted is concerned, and this accounts for a reduction of the resolving power of the copies; another shortcoming of this known method is due to the technical difficulties of the operation itself; in order to overcome these technical difficulties the operation of this known method must be supervised by highly skilled personnel; and last but not least this known method can only operate with reduced productivity, a drawback that is due first of all to the loss of light in the process (in the case of a full length film of about 2500 m., the technological disanamorphosation process takes nearly 26 days).

It is, therefore, a general object of this invention to provide an optical printing method for the anamorphosation and disanamorphosation of films, which eliminates the afore described disadvantages of the prior art.

The invention entitled "Optical Printing Method Particularly Devised for the Disanamorphosation and Anamorphosation of Films" provides for both the disanamorphosation and the anamorphosation operations to be carried out under better conditions, which are as follows: both disanamorphosation and anamorphosation operations can be worked out independently from the value of the anamorphose factor; the process is achieved through the continuous optical printing of the negatives via a narrow light slit, or via a system of such slits and by means of a movable and spherical optical system.

The novel features which are characteristic for the invention are set forth in particular in the appended claims. The invention itself, however, both as to its construction and its method of operation, together with additional objects and advantages thereof, will be best understood from the following description when read in conjunction with the accompanying schematic diagram, in which the drawing illustrates schematically an apparatus for carrying out the method of this invention by applying it to an optical and light system of a disanamorphosation and anamorphosation printer.

Referring now to the drawing, there is illustrated the negative N, the undeveloped film Pv, which is a transparent and elastic film carrier, covered by a light sensitive coating that has not been exposed to the action of light and which, consequently, contains no visible photographic image, and no latent one, the movable optical system SO and the light slit (possibly consisting of a slit system $f$ and of a light source S). All of the afore-listed elements are mounted relatively movable with respect to each other, thus, the movements of the elements are correlated in such a way so as to bring forth several constructive solutions which render different types and relationships of movements of the various elements and different values as well (i.e. linear movement, movement of rotation, constant movement, variable movement, movement in the same directions or movement in opposite directions; as to the velocity values of the several movements, they may be equal to zero, they may be equal with respect to several elements, etc.).

The negative N is moving continuously in one direction; its average linear speed $Vm_1$ is rigorously maintained by means of a special stabilization device (not illustrated). By means of standard kniematic devices (not illustrated), the driving mechanism of the undeveloped film Pv (not illustrated) is connected to the driving mechanism of the negative N film (not illustrated). The former one is moving at a linear average velocity of $Vm_2$, stabilized by means of a stabilization device (not illustrated), similar to the one used for the continuous motion of the negative film N (also not illustrated). Although the linear average speeds $Vm_1$ and $Vm_2$ may be in the relation $Vm_1 \geqq Vm_2$ with respect to each other (during the disanamorphosation operation, the relation is practically $Vm_1 \leqq Vm_2$), due to the smaller contraction of the undeveloped film, the frequency of the perforations of both the N and Pv films is equal, their run being effectuated at the same rate, even after the development of the undeveloped film Pv.

A spherical optic system SO is movably mounted between the films N and Pv which are spaced apart at a distance $l$; the apparatus illustrated on the drawing is adapted to project the image of the negative film N on the undeveloped film Pv by means of a linear magnification K, which represents the anamorphose factor of the optical system used in the filming operation (the anamorphose factor may differ from $K=2$ used in the Cinemascope system; it may thus have different values, including the value $K=1$, which ensures a normal printing of the films).

By using the SO spherical and movable optical system in a predetermined position which provides a preselected K magnification, the image is "spread" in every direction. Thus in the plane in which it was anamorphosated, the image gets its ordinary dimensions which are related to a spherical optical system; in the other plane, however, being spread K times, the image is to be subsequently compressed.

The negative film N is then illuminated by a light source S and its image is projected onto the undeveloped film Pv through the slit $f$ (the slit may be either positioned as shown in the drawing, or set close to the undeveloped film Pv ($f_2$); it also is possible to have slits mounted in several places, i.e. a system of slits); the compression of the image on the undeveloped film is thus achieved at a ratio K, because of the fact that while the films N and Pv are moving at a rate of one photograph ($hn$ and $hp$), the projected image of the film N on the film Pv is moving at a rate of K$hn$.

The resolving power of the system is determined in accordance with the width of the slit $f$, and by the position as well as by the direction of the movement of the film N with relation to the film Pv ($Vm_1\downarrow$ or $Vm_1\uparrow$; when $Vm_1 \cong Vm_2$).

$$R \text{ maximum} = 1.000 \frac{K}{f}$$

(in the case of both the negative image and the undeveloped film moving in the same direction, the slit being close to the undeveloped film), in which:

R = the resolving power,
K = the magnification of the spherical optical system (equal to the average anamorphose factor),
$f$ = the width of the slit in $\mu$.

In the case of the anamorphosation, the spherical and movable optical system SO is to be positioned in such a manner as to enable the projection of an image of the photograph N to be K times compressed in the undeveloped film Pv.

Thus, in the plane in which the image is to be anamorphosated, it obtains the dimensions which are related to an anamorphotic optical system, the anamorphotic factor being K; in the other plane the image is to be "spread."

The spreading effect can be obtained in the same way as the compression described above.

When dealing with anamorphosation, generally $Vm_1 > Vm_2$ $$R \text{ maximum} = \frac{1.000 \ Vm_1 K}{Vm_2 f}$$

(in the case of both the negative image and the undeveloped film moving in the same direction, the slit being close to the undeveloped film), in which:

$Vm_1$ is the average linear speed of the negative film, and $Vm_2$ is the average linear speed of the undeveloped film.

The optical printing method, particularly devised for the disanamorphosation and anamorphosation of films has the following advantages:

It eliminates the deviations from the pre-established anamorphose factor in the plane in which disanamorphosation and anamorphosation operations are carried out;

It gives partial compensation for the deviations of the above mentioned factor from its nominal value—deviations which are brought forth during the fiming process, owing to the standard anamorphotic optical system;

By using a single spherical lens, it greatly simplifies the optical system and leads to the total elimination of the aberrations introduced by the standard anamorphotic optical system used in other printing methods;

It leads to an increase of information: theoretically, when $f \to o$, $R \to \infty$; practically, when the width of the slit $f$ amounts to $20\mu$ (0.02 mm.), the system resolving power "R maximum" (in the case of disanamorphosation K=2) is of 100 lines per mm.; we have used with great success a $20\mu$ (0.02 mm.) slit on high quality test films. Taking into account the final result obtained on the positive print, the disanamorphosation methods now in use, ensure a resolution of only 35 to 40 lines per mm., that is 2.5 times inferior to the results obtained with an apparatus of the present invention;

By codifying and automatizing the process, it secures a selective integration of the image (the panning of the shot scenes);

It does not require the direction and supervision of highly skilled personnel.

The method of this invention has improved the technical and artistic quality of both normal prints obtained from cinemascope variants by means of disanamorphosation, and of cinemascope prints obtained by anamorphosation of panoramic films.

I claim:

1. A method of reproducing photographically motion picture records by anamorphosation or disanamorphosation thereof, comprising the steps of continuously optically printing the images projected by means of a light source from a moving motion picture film negative via an axially movable spherical optical system onto a moving motion picture undeveloped film and its position being adjusted prior to starting the photographic reproduction method in accordance with the anamorphotic factor of the photographic reproduction method, and narrow slit means operatively mounted in the light path of said light source, transversely to the distorted dimensions of said projected images, so that said light source projects light via said narrow slit means onto said undeveloped film, the movements of said motion picture film negative and said undeveloped motion picture film being synchronized with respect to each other.

2. The method of photographically reproducing motion picture records by anamorphosation or disanamorphosation thereof, as set forth in claim 1, wherein said narrow slit means comprises a system of narrow slits which are spaced at a predetermined distance from each other.

3. An optical printing method for motion picture records particularly adapted for the anamorphosation and disanamorphosation of films, comprising the steps of continuously optically printing the images of a moving motion picture film, illuminating a predetermined portion of said film by means of a light source, projecting the images on said portion via a narrow slit, which is transverse to the distorted dimension of said image, and an optical system movable along its axis, on a moving unexposed film, said optical system being axially adjustably to a position, prior to starting the optical printing method in accordance with the anamorphotic factor of the optical printing method, the movements of said motion picture film and said unexposed film being correlated with respect to each other.

4. The method as set forth in claim 3, wherein said narrow slit has a maximum width of 0.02 mm. ($20\mu$).

References Cited

UNITED STATES PATENTS

| | | | |
|---|---|---|---|
| 1,786,220 | 12/1930 | Owens | 88—24 |
| 1,801,450 | 4/1931 | Owens | 88—24 |
| 3,165,969 | 1/1965 | Gunn | 88—24 |

NORTON ANSHER, *Primary Examiner.*

R. A. WINTERCORN, *Assistant Examiner.*